(12) United States Patent
Jasinski et al.

(10) Patent No.: US 8,736,704 B2
(45) Date of Patent: May 27, 2014

(54) DIGITAL CAMERA FOR CAPTURING AN IMAGE SEQUENCE

(75) Inventors: David Wayne Jasinski, Rochester, NY (US); William Vernon Fintel, Rochester, NY (US)

(73) Assignee: Apple Inc., Cupertino, CA (US)

( * ) Notice: Subject to any disclaimer, the term of this patent is extended or adjusted under 35 U.S.C. 154(b) by 262 days.

(21) Appl. No.: 13/071,615

(22) Filed: Mar. 25, 2011

(65) Prior Publication Data

US 2012/0242853 A1  Sep. 27, 2012

(51) Int. Cl.
H04N 5/228 (2006.01)
(52) U.S. Cl.
USPC ......... 348/222.1; 348/239; 382/103; 382/107
(58) Field of Classification Search
USPC .................... 348/220.1, 221.1, 222.1, 208.1; 382/103, 107
See application file for complete search history.

(56) References Cited

U.S. PATENT DOCUMENTS

| | | | |
|---|---|---|---|
| 3,971,065 A | 7/1976 | Bayer | |
| 4,642,678 A | 2/1987 | Cok | |
| 4,774,574 A | 9/1988 | Daly et al. | |
| 5,016,107 A | 5/1991 | Sasso | |
| 5,140,434 A | 8/1992 | Van Blessinger et al. | |
| 5,189,511 A | 2/1993 | Parulski et al. | |
| 5,196,938 A * | 3/1993 | Blessinger | 348/22 |
| 5,493,335 A | 2/1996 | Parulski et al. | |
| 5,598,237 A | 1/1997 | McIntyre et al. | |
| 5,652,621 A | 7/1997 | Adams, Jr. et al. | |
| 5,668,597 A | 9/1997 | Parulski et al. | |
| 5,929,919 A | 7/1999 | DeHaan et al. | |
| 6,192,162 B1 | 2/2001 | Hamilton, Jr. et al. | |
| 6,282,317 B1 | 8/2001 | Luo | |
| 6,292,218 B1 | 9/2001 | Parulski et al. | |
| 6,539,169 B1 | 3/2003 | Tsubaki | |
| 6,885,395 B1 | 4/2005 | Rabbani | |
| 6,934,056 B2 | 8/2005 | Gindele et al. | |
| 7,024,054 B2 | 4/2006 | Cahill | |
| 7,542,077 B2 | 6/2009 | Miki | |

(Continued)

FOREIGN PATENT DOCUMENTS

| | | |
|---|---|---|
| EP | 1 486 928 | 12/2004 |
| EP | 2139226 | 12/2009 |
| JP | 2004260717 | 9/2004 |

OTHER PUBLICATIONS

U.S. Appl. No. 13/021,067, filed Feb. 4, 2011, Jasinski et al.

(Continued)

Primary Examiner — Paul Berardesca
(74) Attorney, Agent, or Firm — Wong, Cabello, Lutsch, Rutherford & Brucculeri, LLP

(57) ABSTRACT

A digital camera having a burst image capture mode, comprising: an image sensor; an optical system; a data processing system; an image memory; and a program memory storing instructions configured to implement a method for capturing a sequence of digital images in the burst image capture mode. The instructions include: capturing a sequence of digital images of the scene using the image sensor, each digital image being captured at a different time; identifying a moving object in the captured digital images; automatically determining the position of the moving object in each of the captured digital images; automatically selecting a subset of the captured digital images where the moving object has positions that most nearly correspond to a set of desirable positions; and storing the selected subset of captured digital images in the image memory.

20 Claims, 11 Drawing Sheets

(56) References Cited

U.S. PATENT DOCUMENTS

| | | |
|---|---|---|
| 7,546,026 B2 | 6/2009 | Pertsel |
| 7,657,164 B2 | 2/2010 | Nomura |
| 7,720,376 B2 | 5/2010 | Weinberg |
| 7,755,667 B2 | 7/2010 | Rabbani |
| 8,164,651 B2 | 4/2012 | Hamilton, Jr. |
| 8,319,859 B2 | 11/2012 | Kim |
| 8,379,934 B2 | 2/2013 | Jasinski |
| 2002/0080881 A1 | 6/2002 | Honda |
| 2004/0075750 A1 | 4/2004 | Bateman |
| 2005/0128343 A1 | 6/2005 | Murata |
| 2005/0191729 A1 | 9/2005 | Kaczmarek |
| 2005/0212912 A1 | 9/2005 | Huster |
| 2007/0024931 A1 | 2/2007 | Compton et al. |
| 2007/0092244 A1 | 4/2007 | Pertsel |
| 2007/0188617 A1 | 8/2007 | Stavely |
| 2007/0236567 A1 | 10/2007 | Pillman |
| 2007/0237506 A1 | 10/2007 | Minema |
| 2007/0237514 A1 | 10/2007 | Pillman et al. |
| 2007/0248330 A1 | 10/2007 | Pillman |
| 2008/0024619 A1 | 1/2008 | Ono |
| 2008/0094498 A1 | 4/2008 | Mori |
| 2008/0298795 A1 | 12/2008 | Kuberka |
| 2009/0040364 A1 | 2/2009 | Rubner |
| 2009/0128647 A1 | 5/2009 | Fahn |
| 2009/0237527 A1 | 9/2009 | Mizuno |
| 2009/0244301 A1 | 10/2009 | Border |
| 2009/0295931 A1 * | 12/2009 | Cho .................. 348/220.1 |
| 2010/0208087 A1 | 8/2010 | Ogawa |
| 2011/0043639 A1 | 2/2011 | Yokohata |
| 2012/0243802 A1 | 9/2012 | Fintel |

OTHER PUBLICATIONS

Aroh Barjatya, "Block matching algorithms for motion estimation" IEEE Digital Image Process 6620, pp. 1-6 (2004).

International Search Report and Written Opinion received in corresponding PCT Application No. PCT/US2012/028683, dated Jul. 27, 2012.

International Search Report and Written Opinion received in corresponding PCT Application No. PCT/US2012/023287, dated Jul. 27, 2012.

Suh et al., "Fast sub-pixel motion estimation techniques having lower computational complexity," IEEE Transactions Consumer Electronics, vol. 50, pp. 968-973 (2004).

* cited by examiner

DIGITAL CAMERA FOR CAPTURING AN IMAGE SEQUENCE

CROSS-REFERENCE TO RELATED APPLICATIONS

Reference is made to U.S. patent application Ser. No. 13/021,034, entitled "Estimating subject motion for capture setting determination," by Jasinski et al.; to U.S. patent application Ser. No. 13/021,067, entitled "Estimating subject motion between image frames," by Jasinski et al., to U.S. patent application Ser. No. 13/071,585, entitled "Digital camera having burst image capture mode," by Fintel et al., and to U.S. patent application Ser. No. 13/071,595, entitled "Composite image formed from an image sequence," by Fintel et al., each of which are incorporated herein by reference.

FIELD OF THE INVENTION

This invention pertains to the field of digital imaging, and more particularly to a method for selecting a subset of digital images in a captured digital image sequence based on a determined position for a moving object.

BACKGROUND OF THE INVENTION

Digital camera devices have continued to increase in complexity and capabilities with the advent of new image capture modes that offer the user unique output image characteristics. One such image capture mode is a composite burst image capture mode where a plurality of images are acquired over a specified time interval and one or more subjects in the scene are extracted from multiple images and combined onto a common background. The resulting composite image provides a stop action effect for the subject in motion as illustrated in FIG. 1A. As a creative mode, this capability enables the user to observe the motion of a skier, the running of a child or any other conditions where subject motion allows for a proper stop-action effect.

A key consideration of the composite burst image mode is the proper selection of the time separation between individual captures that are combined into the single composite image. Currently, for typical embodiments of this image capture mode, various image capture settings (e.g., the number of "burst" images and, either the total time duration for the image sequence or the time spacing between sequential image captures) must be specified via a user interface prior to the user capturing the moment of action. This requires the user to make a guess about the appropriate image capture settings prior to initiating the capture of the sequence of images. Given that knowledge about the motion of the moving objects will be rarely known in advance, this can lead to unsatisfactory results in many cases. This can be further complicated by the fact that the user may forget to adjust the image capture settings before the capture of new conditions. An example of an unsatisfactory result would correspond to the subject moving too slowly relative to the capture rate, resulting in too little separation between the object positions in the resulting composite image as illustrated in FIG. 1B. An analogous problem would occur when the subject is moving too rapidly relative to the capture rate so that it moves too quickly through the camera's field of view. Both of these examples would result in a poor user experience of the resulting output composite image.

Some recently introduced digital cameras include a capability to automatically analyze captured images to determine the motion characteristics present within the image content of interest. The motion characteristics are used for purposes such as determining the optimal exposure time.

Various methods of estimating motion are available to those skilled in the art, the most common of which is to capture two images separated in time and measure the change in spatial location of objects between frames. One such method is described by De Haan in U.S. Pat. No. 5,929,919, entitled "Motion-compensated field rate conversion."

U.S. Patent Application Publication 2007/0237514 to Pillman et al., entitled "Varying camera self-determination based on subject motion," teaches a method for capturing digital images where motion in the scene is measured prior to image capture. Various camera settings are adjusted responsive to the determined scene motion.

There remains a need for a method to adjust image capture settings and image buffer management for an electronic image capture device to provide improved image quality of a final composite image containing moving objects captured in a burst image capture mode.

SUMMARY OF THE INVENTION

The present invention represents a digital camera having a burst image capture mode, comprising:
   an image sensor for capturing a digital image;
   an optical system for forming an image of a scene onto the image sensor;
   a data processing system;
   an image memory for storing captured digital images; and
   a program memory communicatively connected to the data processing system and storing instructions configured to cause the data processing system to implement a method for capturing a sequence of digital images in the burst image capture mode, wherein the instructions include:
      capturing a sequence of digital images of the scene using the image sensor, each digital image being captured at a different time;
      identifying a moving object in the captured digital images;
      automatically determining the position of the moving object in each of the captured digital images;
      automatically selecting a subset of the captured digital images where the moving object has positions that most nearly correspond to a set of desirable positions; and
      storing the selected subset of captured digital images in the image memory.

This invention has the advantage that the frame rate used to capture the sequence of digital images is optimized relative to the rate of motion of the moving object. Other image capture settings such as the number of images in the sequence of digital images, as well as the exposure time and exposure index, can also be automatically optimized responsive to the rate of motion It has the further advantage that the sequence of digital images can be used to create composite burst images where the spatial displacement of the moving object is optimized without the need for the user to guess at the image capture settings that would be needed to produce a desirable result.

It has the additional advantage that the rate of motion can be determined by automatically analyzing the evaluation images to identify moving objects that are likely to be of interest to the photographer. In this way, the frame rate can be determined in a manner that accounts for the object motions that are most likely to affect perceived image quality of the composite image.

Figure 1B:
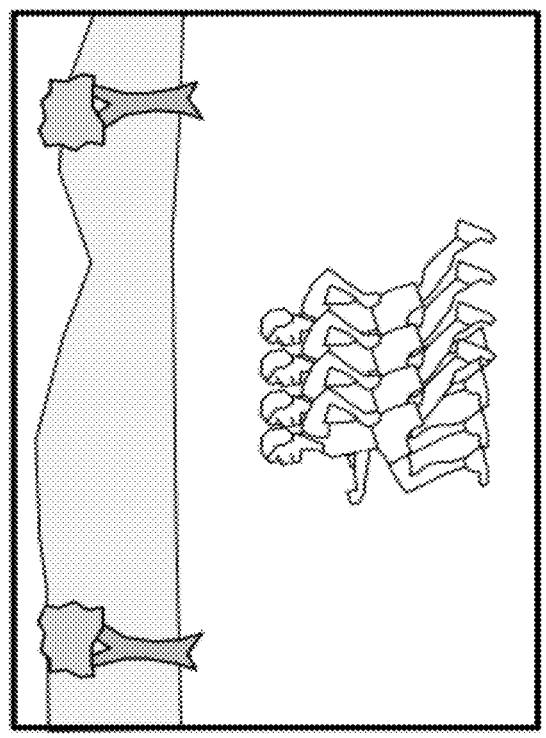
FIG. 1B is an illustration of a composite image captured using a composite burst image capture mode using a suboptimal time interval.

It is to be understood that the attached drawings are for purposes of illustrating the concepts of the invention and may not be to scale.

DETAILED DESCRIPTION OF THE INVENTION

The present invention represents a digital camera having a burst image capture mode setting where the velocity of an object in the frame of view is used to determine the capture frame rate and the memory buffer requirements, which are then used to generate a composite image highlighting the object in motion. This invention provides a configuration for automatically determining various image capture settings, thereby reducing the need for the operator to manually determine the image capture settings, and reducing the number of unacceptable results.

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

Figure 2:
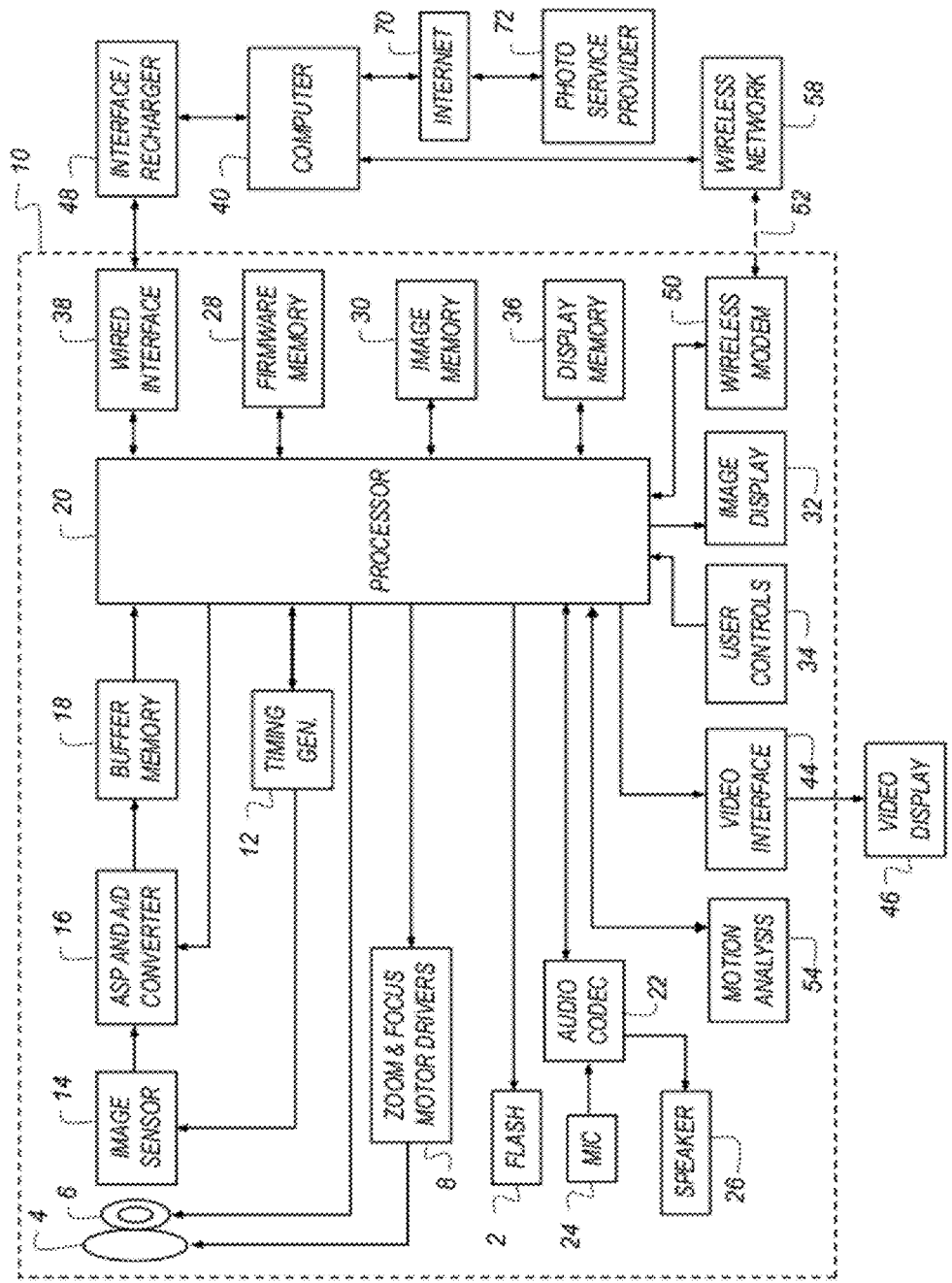
FIG. 2 is a high level schematic diagram of a camera system in a preferred configuration of the present invention for controlling the burst rate capture of an image sequence.

FIG. 2 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 2 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is commonly controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor 14 is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024931 to Compton and Hamilton, entitled "Image sensor with improved light sensitivity," the disclosure of which is incorporated herein by reference. These examples are not limiting, and many other color patterns may be used.

A motion analysis block 54 is used to analyze captured preview images to characterize motion in the scene. Preferably, the motion analysis block 54 uses consecutively captured analysis images to determine image motion vectors representing the velocity associated with specific image subject content. The motion analysis block 54 can use any method known in the art to determine the image motion vectors. In one embodiment, the method for estimating subject motion described in co-pending, commonly assigned U.S. patent application Ser. No. 13/021,067 to Jasinski et al., entitled, "Estimating subject motion between image frames," which is incorporated herein by reference, can be used to determine image motion vectors for one or more objects in the image. Other methods for determining image motion vectors would include the method described by De Haan in U.S. Pat. No. 5,929,919, entitled "Motion-compensated field rate conversion," and the method described by Barjatya in the article "Block matching algorithms for motion estimation" (DIP 6620 final project paper, Utah State University, Spring 2004).

As will be discussed in more detail later, when the digital camera 10 is being operated in a burst image capture mode, the present invention incorporates the information from the motion analysis block 54 and the timing generator 12 to determine various image capture parameters and to control allocation of the buffer memory 18.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 2, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1920×1040 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor 14, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the F/# and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene. As described in commonly-assigned, co-pending U.S. patent application Ser. No. 13/021,034 to Jasinski et al., entitled "Estimating subject motion for capture setting determination," the F/# and the exposure time, as well as the flash setting are preferably determined responsive to a detected motion velocity.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, burst image capture mode, and review mode, and to initiate capture of still images, recording of motion images. The user controls 34 are also used to set user processing preferences, and to choose between various photography modes based on scene type and taking conditions. In some embodiments, various camera settings may be set automatically in response to analysis of preview image data, audio signals, or external signals such as GPS, weather broadcasts, or other available signals.

In some embodiments, when the digital camera 10 is in a still photography mode the above-described preview mode is initiated when the user partially depresses a shutter button, which is one of the user controls 34, and the still image capture mode is initiated when the user fully depresses the shutter button. The user controls 34 are also used to turn on the digital camera 10, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, the user controls 34 can include a means to receive input from the user or an external device via a tethered, wireless, voice activated, visual or other interface. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be used to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak Easy-Share Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 3:
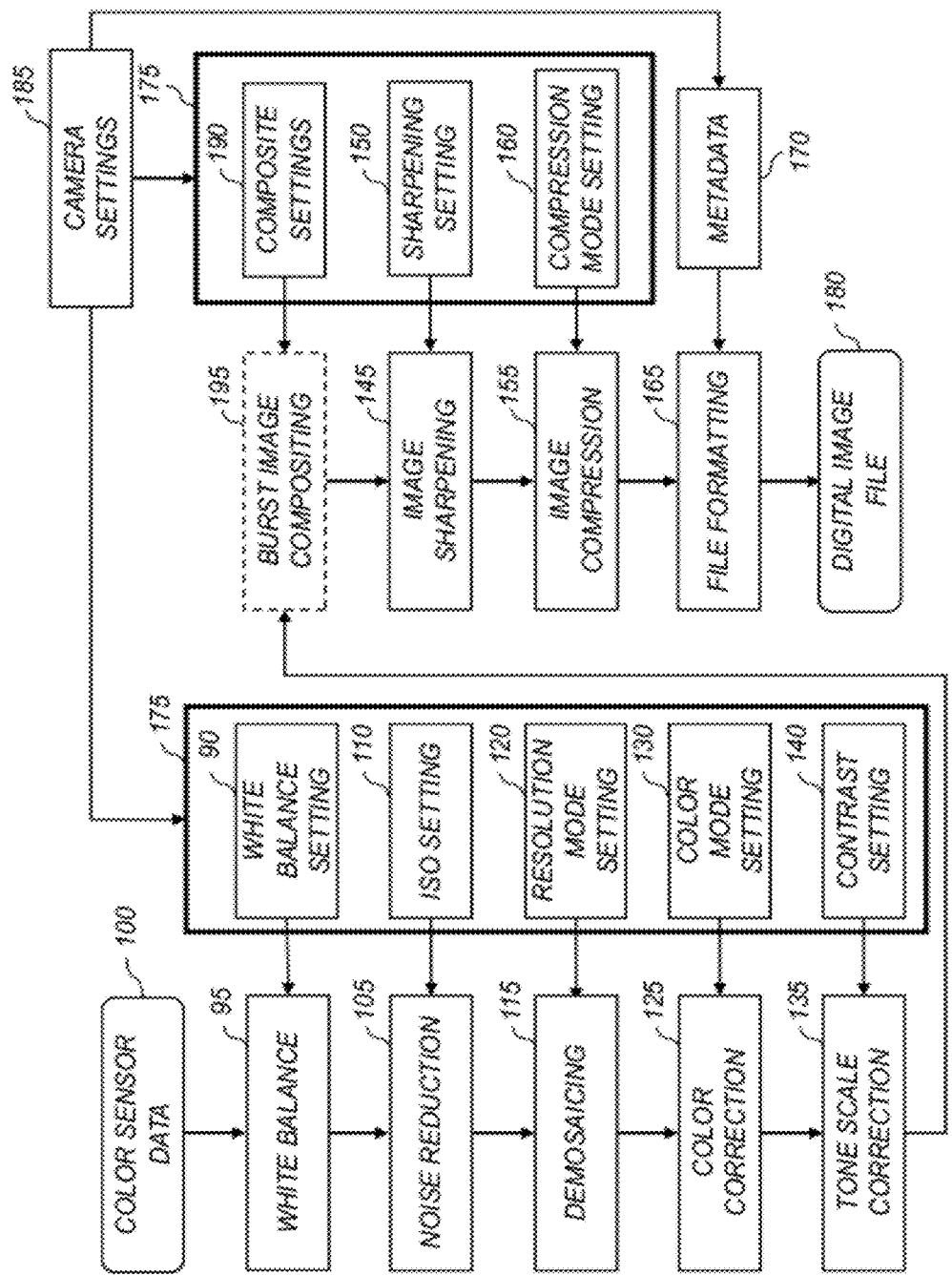
FIG. 3 is a high-level diagram showing the components of a digital camera system.

FIG. 3 is a flow diagram depicting image processing operations that can be performed by the processor 20 in the digital camera 10 (FIG. 2) in order to process color sensor data 100 from the image sensor 14 output by the ASP and A/D converter 16. In some embodiments, the processing parameters used by the processor 20 to manipulate the color sensor data 100 for a particular digital image are determined by various photography mode settings 175, which are typically associated with photography modes that can be selected via the user controls 34, which enable the user to adjust various camera settings 185 in response to menus displayed on the image display 32. As will be described later, in the Composite mode settings 190 and the camera settings 185 (including the image capture settings for the buffer memory 18 and the timing generator 12 from FIG. 2) are adjusted responsive to a determined motion velocity according to a preferred embodiment.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Miki, entitled "White balance adjustment device and color identification device", the disclosure of which is herein incorporated by reference. The white balance can be adjusted in response to a white balance setting 90, which can be manually set by a user, or which can be automatically set by the digital camera 10.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to the exposure index setting 110, so that more filtering is performed at higher exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera 10 can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 4,000×3,000 pixels), medium size (e.g. 2,000×1,500 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (normal color reproduction) (1)
$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix}$$

Setting 2 (saturated color reproduction) (2)
$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix}$$

Setting 3 (de-saturated color reproduction) (3)
$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix}$$

Setting 4 (monochrome) (4)
$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix}$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

When the digital camera 10 is operating in the burst image capture mode, a burst image compositing step 195 can optionally be used to form a composite image according to composite settings 190. This step is shown with a dashed outline reflecting the fact that it is an optional step that is only applied when the user has set the user controls 34 of the digital camera 10 to form a composite image using the burst image capture mode. Using the selected digital images contained within the image buffer 18, specific image scene components within each digital image are combined to form the composite image. Typically, an image background is formed using image content from one or more of the digital images. Then subject image regions corresponding to one or more objects that had transitioned across the image background are extracted from the selected digital images and merged onto the image background. Additional details regarding the capturing of a set of digital images that can be used for the burst image compositing step 195 will be described later.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about various camera settings 185, including the photography mode settings 175.

When the digital camera 10 is operated in a burst image capture mode, the image sensor 14 is actuated by the timing generator 12 as specified by the motion analysis 54 to fill the buffer memory 18 with a set of captured digital images. In some embodiments, the set of captured digital images is then used to form a composite burst image using the burst image compositing step 195.

Figure 1A:
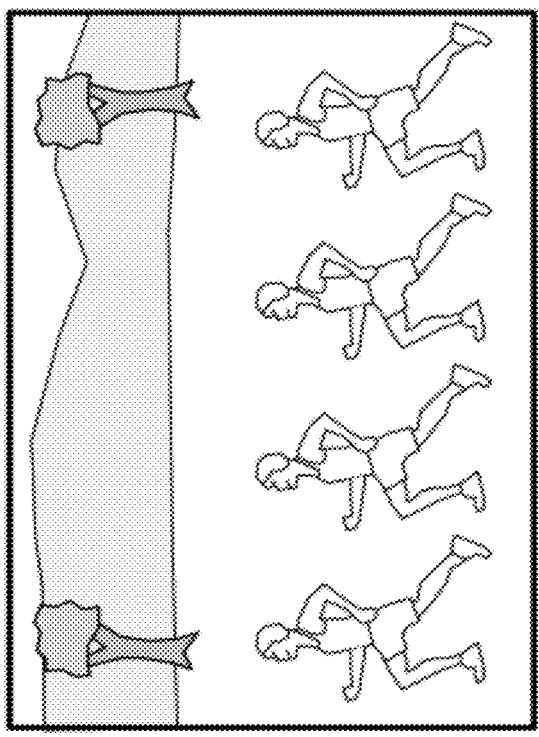
FIG. 1A is an illustration of a composite image captured using a composite burst image capture mode.
Figure 4:
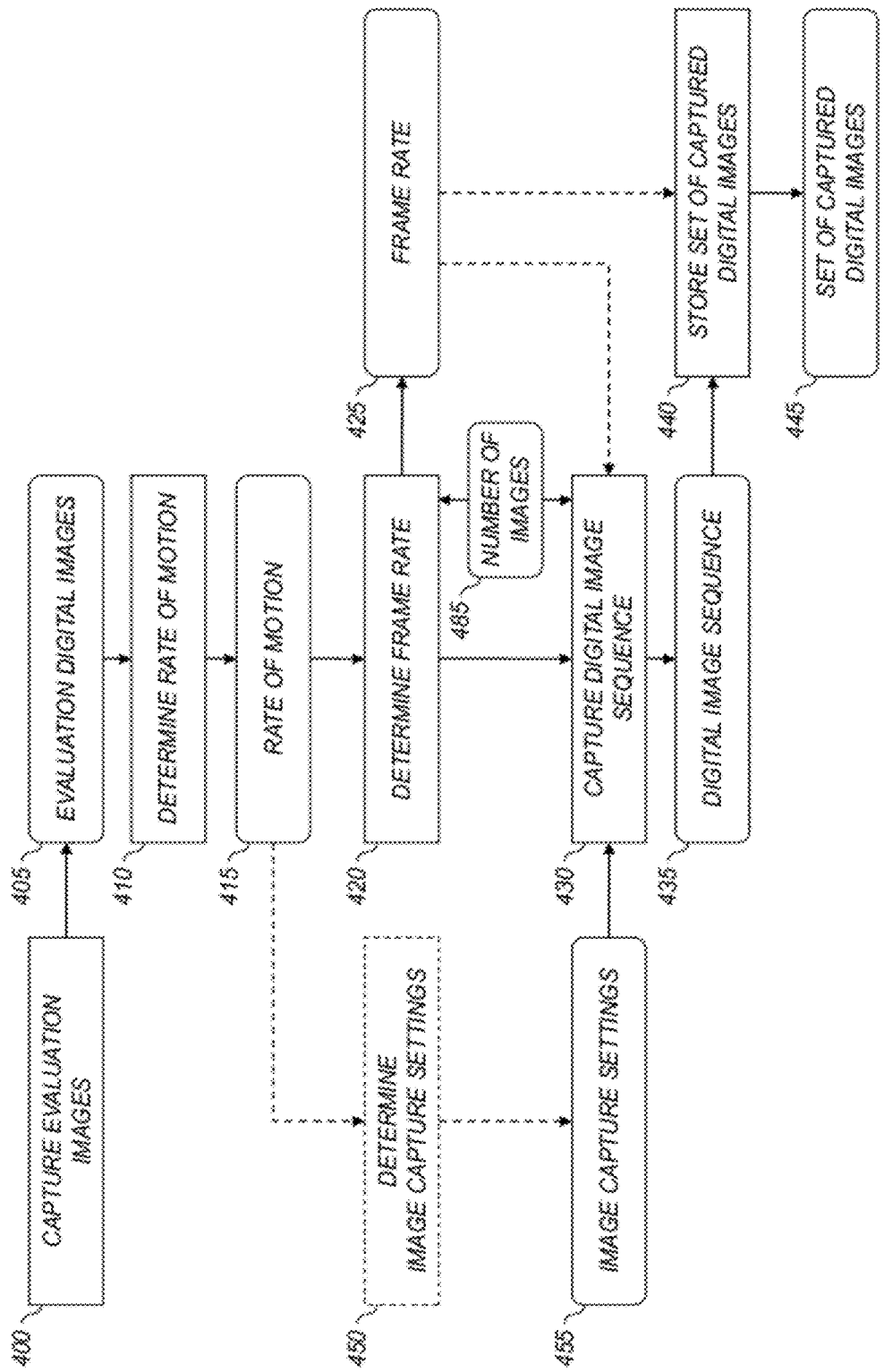
FIG. 4 is a flow chart of a method for capturing a sequence of digital images in a burst image capture mode.

FIG. 4 shows a flowchart for a method of capturing digital images in a burst image capture mode according to an embodiment of the present invention. A capture evaluation images step 400 is used to capture two or more evaluation digital images 405 of a scene that includes at least one moving object. In some embodiments, this step is performed at the time when the user activates a user interface control (e.g., a shutter button) to initiate the capture of a burst of digital images. In other embodiments, the digital camera 10 (FIG. 1) is configured so that the capture evaluation images step 400 runs continuously in the background when the digital camera 10 is turned on and is set to operate in the burst image capture mode. In some embodiments, the capture evaluation images step 400 is initiated when the user presses the shutter button to an intermediate position in preparation for initiating the capture of a burst of digital images.

A determine rate of motion step 410 is used to determine a rate of motion 415 for at least one moving object by analyzing the evaluation digital images 405. In a preferred embodiment, the rate of motion 415 is an image motion vector giving a direction and a magnitude of the object motion. The determine rate of motion step 410 is performed by the motion analysis block 54 shown in FIG. 2. As mentioned earlier, the motion analysis block 54 can use any method known in the art to determine the rate of motion, such as the method for estimating subject motion described in the aforementioned U.S. patent application Ser. No. 13/021,067, entitled "Estimating subject motion between image frames."

In a preferred embodiment, the determine rate of motion step 410 determines the rate of motion 415 for a moving foreground object in the scene. In some instances, the determine rate of motion step 410 may detect a plurality of moving foreground objects in the scene. In such cases, a number of different strategies can be used to determine the rate of motion 415. For example, the rate of motion 415 can be determined for the fastest moving object, or the moving object nearest to the center of the frame.

In some embodiments, the rates of motion for the plurality of moving foreground objects can be combined to determine a combined rate of motion. For example, a weighted average of the magnitudes of the rates of motion can be computed. The weights used for the weighted average can be determined in a variety of ways. For example, they can be a function of the size or the position of the moving objects.

In some embodiments, a main subject detection algorithm can be used to identify a main subject in the scene. If the main subject corresponds to one of the moving objects, the rate of motion 415 can then be determined based on the main subject. Any method for detecting the main subject known in the art can be used to identify the main subject. Main subject detection algorithms are well-known in the art. One example of a main subject detection algorithm that can be used in accordance with the present invention is described in U.S. Pat. No. 6,282,317 to Luo et al., entitled "Method for automatic determination of main subjects in photographic images," which is incorporated herein by reference.

A determine frame rate step 420 is used to determine a frame rate 425 to be used to capture the burst of digital images responsive to the rate of motion 415. The frame rate 425 will also typically be a function of a number of images 485 to be included in the burst of digital images. In some configurations, the number of images 485 can be predefined at some fixed value. In other configurations, the number of images 485 can be selected by the user using appropriate user interface elements, such as a menu of options displayed on the image display 32 (FIG. 2). In some embodiments, the number of images 485 can be automatically determined responsive to other factors such as the size of the moving object or the rate of motion 415. For example, the number of images 485 can be determined so that the image of the moving object in each of the captured digital images will be substantially non-overlapping with the images of the moving object in the other captured digital images. In this case, for larger objects it would be necessary to use a smaller number of images 485 relative to the number of images that could be used for smaller objects. By substantially non-overlapping, we mean that the images of the moving objects in the captured digital images only overlap to small extent (e.g., <10% of the object areas).

Figure 5:
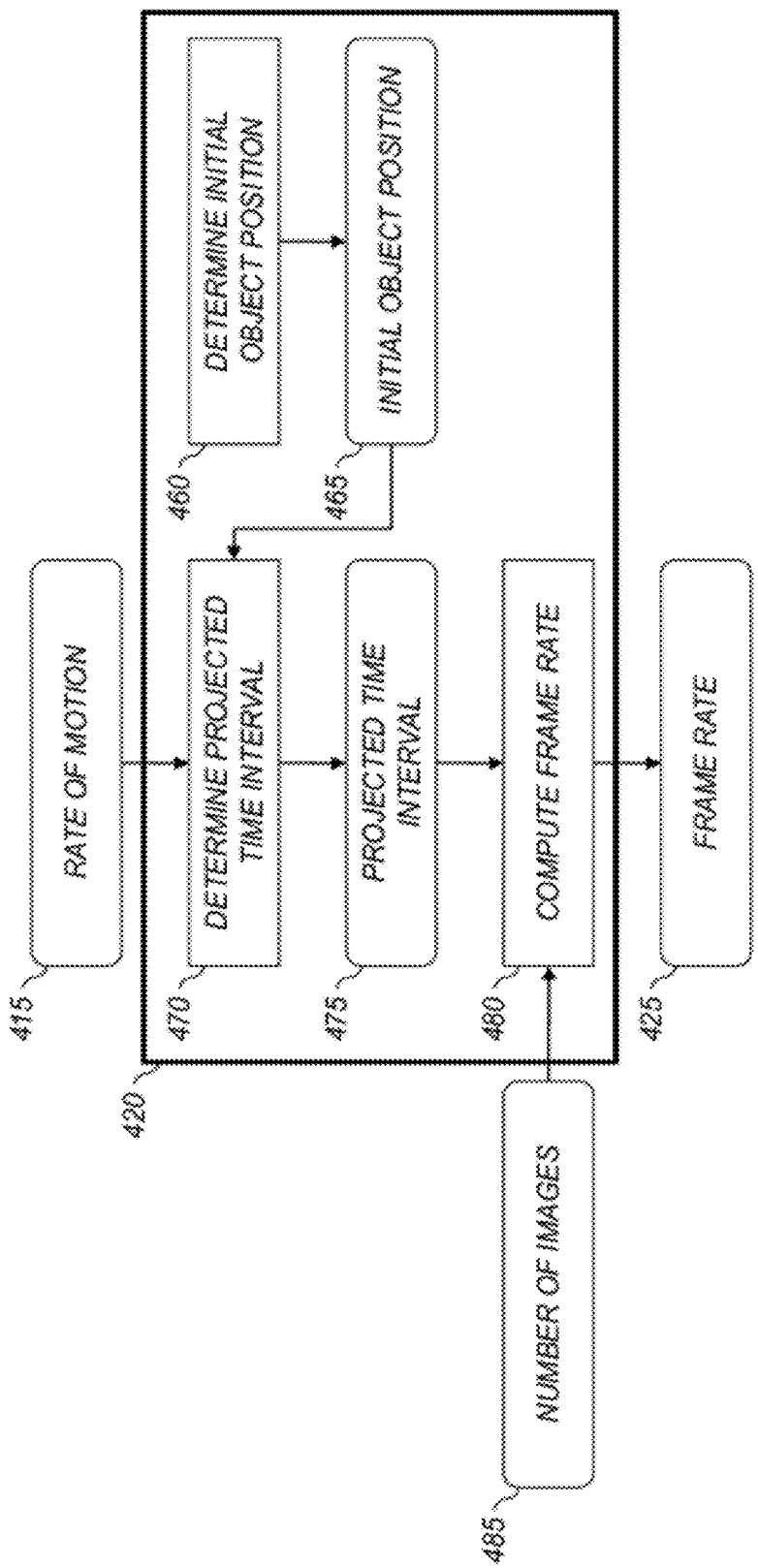
FIG. 5 is a flow chart showing additional details for the determine frame rate step of FIG. 4 according to one embodiment.

The determine frame rate step 420 can determine the frame rate 425 using a variety of different strategies. Generally, the frame rate 425 should be selected such that the moving foreground object is spaced out with aesthetically pleasing spatial separations. Additional details for the determine frame rate step 420 according to a preferred embodiment is shown in FIG. 5. A determine initial object position step 460 is used to determine an initial object position 465 for the moving object corresponding to the determined rate of motion 415.

A determine projected time interval step 470 is used to determine a projected time interval 475 responsive to the rate of motion 415 and the initial object position 465. The projected time interval 475 corresponds to the time required for the moving object to reach the edge of the image. In a preferred embodiment, the rate of motion 415 is a motion vector having both a direction and a magnitude. In this case, the projected time interval 475 can be determined by finding a distance D between the initial object position 465 and the edge of the image in the direction associated with the rate of motion 415. In some embodiments, the distance D can be chosen such that most, or all, of the moving object still falls within the image area at the time when the last image is captured. In this case, the initial object position 465 can be taken to be the position of the "leading edge" of the moving object, so that the distance D corresponds to the distance that the leading edge needs to travel before it reaches the edge of the image. In a preferred embodiment, the distance D is given in units of pixels. However, in other embodiments, the distance D can be expressed in any convenient unit.

Given the distance D, the projected time interval 475 can be computed using the following equation:

$$T = D/V \quad (5)$$

where V is the magnitude of the rate of motion 415 (i.e., the "speed"), and T is the projected time interval 475. The value of V can be expressed in any convenient unit such as pixels/sec. (In some embodiments, the displacement (in units of pixels) for the moving object between two consecutive evaluation digital images 405 can be used as a surrogate for the velocity since it will be proportional to the velocity.) It will generally be convenient if the spatial component of V use the same units (e.g., pixels) as the distance D.

A compute frame rate step 480 is used to compute the frame rate 425 responsive to the projected time interval 475 and the number of images 485. In a preferred embodiment, the frame rate 425 can be determined using the following equation:

$$R = N/T \quad (6)$$

where N is the number of images 485 and R is the frame rate 425 expressed in terms of images per unit time (e.g., images/sec).

Returning to a discussion of FIG. 4, a capture digital image sequence step 430 is used to capture a digital image sequence 435 including a burst of digital images. In a preferred embodiment, the capture digital image sequence step 430 captures the digital image sequence 435 by adjusting the signal timing produced by the timing generator 12 (FIG. 2) to capture the digital images at the frame rate 425. In one configuration, this can be done using the variable frame rate configuration described in U.S. Pat. No. 5,140,434 to Van Blessinger et al., entitled "Record on command recording in a solid state fast frame recorder," which is incorporated herein by reference.

In some embodiments, the digital image sequence 435 can include one or more of the evaluation digital images 405 that were captured by the capture evaluation images step 400. For example, in one configuration the capture evaluation images step 400 is performed when the user activates the shutter button and two evaluation digital images 405 are captured at the highest possible frame rate. The rate of motion 415 is then determined based on an evaluation of these two evaluation digital images 405, and an appropriate frame rate 425 is determined. One or more of the evaluation digital images 405 are then used to initialize the digital image sequence 435. The capture digital image sequence step 430 then captures additional digital images for inclusion in the digital image sequence 435. If the determined frame rate 425 is slower than the frame rate used to capture the evaluation digital images 405, then any of the evaluation digital images 405 that do not match the determined frame rate 425 can be deleted.

A stored set of captured digital images step 440 is used to store a set of captured digital images 445 in a processor-accessible memory. The processor-accessible memory can be the image memory 30 (FIG. 2), or some other memory such as the buffer memory 18. For the case where the capture digital image sequence step 430 captured the digital image sequence 435 at the determined frame rate 425, the set of captured digital images 445 can include all of the images in the digital image sequence 435.

In an alternate embodiment, the capture digital image sequence step 430 captures the digital image sequence 435 at a predetermined fixed frame rate that is faster than the frame rate 425. In this case, the store set of captured digital images step 440 can select a subset of the captured digital images in the digital image sequence 435 to be stored in the set of captured digital images 445 in accordance with the frame rate 425. For example, the capture digital image sequence step 430 can capture a set of 20 digital images at a fixed frame rate of 8 images/sec and temporarily store the captured digital images in the buffer memory 18 (FIG. 2). If the user has set the number of images 485 in the burst to be N=5, and the determined frame rate 425 is 4 images/sec, the store set of captured digital images step 440 can store images #1, #3, #5, #7 and #9, which would correspond to the images captured at the determined frame rate 425.

In some embodiments, the method of the present invention can be used to extract a burst of digital images from a digital video sequence. In this case, the digital video sequence can be used as the digital image sequence 435. Two or more frames from the digital video sequence can be used for the evaluation digital images 405 in order to determine the rate of motion 415. The store set of captured digital images 440 can then extract a subset of the frames in the digital video sequence corresponding to the determined frame rate 425 to include in the set of captured digital images 445. This process can be done at the time that the digital video sequence is captured, or alternately can be done at any later time as desired by the user. In some cases, the process can be performed after the digital video sequence has been downloaded to a host computer, using software residing on the host computer rather than using software in the digital video camera itself.

The store set of captured digital images 440 can store the set of captured digital images 445 in a variety of different ways. In some embodiments, each digital image in the set of captured digital images 445 can be stored in the image memory 30 (FIG. 2) in separate digital image files. The digital image files can be stored using any format known in the art. In a preferred embodiment, the set of captured digital images 445 can be stored as JPEG files according to the well-known EXIF digital image storage format. In other cases, the set of captured digital images 445 can be stored using other file formats (e.g., using the TIFF file format or a proprietary raw file format).

In other embodiments, the set of captured digital images 445 can be combined to form a composite image, and the composite image can then be stored in the image memory 30 (FIG. 2). In some digital camera implementations, the user can be given the choice to choose between two different burst image capture modes: one mode where the set of captured digital images 445 are each stored in separate files, and a second "composite burst mode" where a composite image is formed from the set of captured digital images 445. In other digital camera implementations, only one type of burst image capture mode may be supported.

Figure 6B:
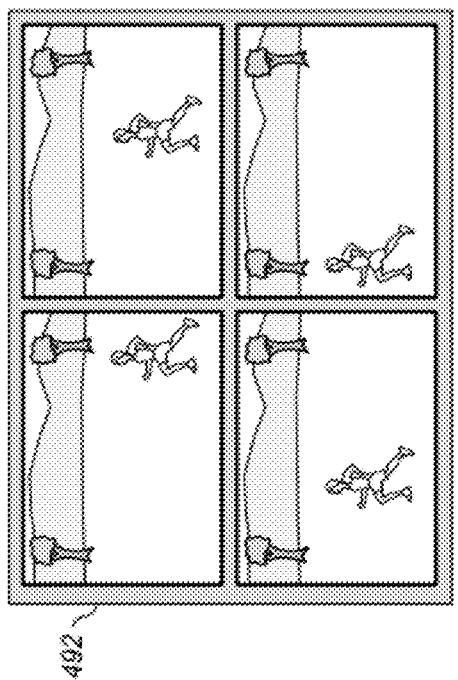
FIGS. 6A-6C show examples of composite images formed using a composite burst mode in accordance with various embodiments.
Figure 6C:
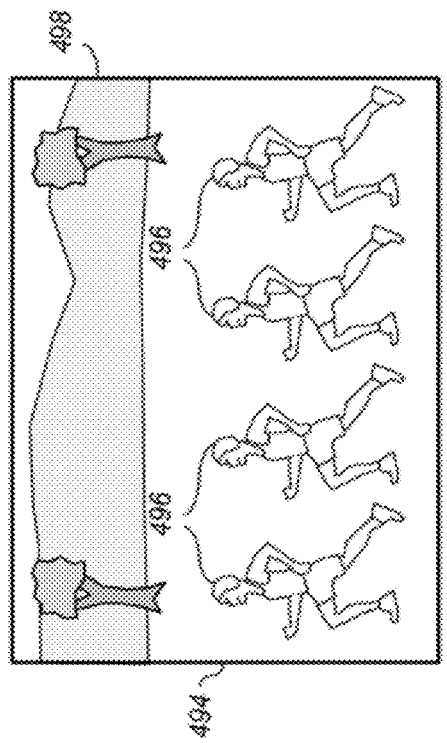
Figure 6A:
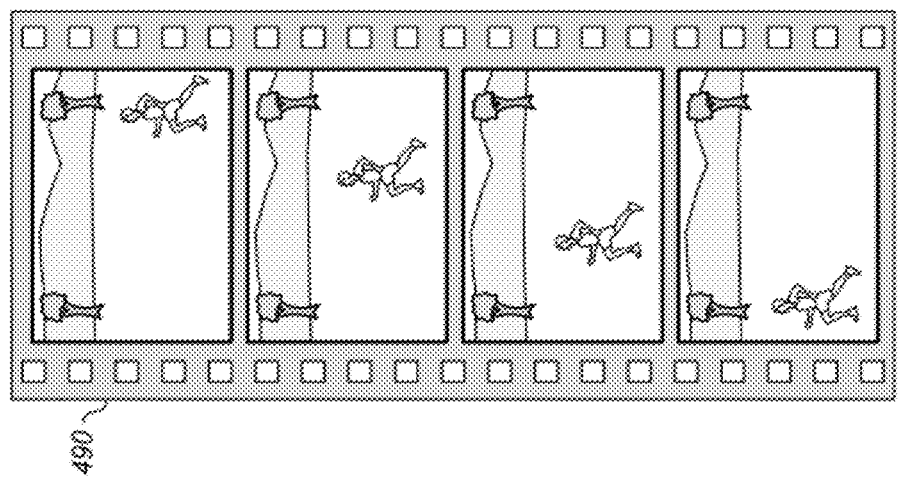

A composite image can be formed from the set of captured digital images 445 using any method known in the art. In one embodiment, the composite image is a montage image formed by inserting each of the digital images in the set of captured digital images 445 into a template so that they can be viewed together. FIG. 6A shows an example of a montage composite image 490 using a "film strip" template. Similarly, FIG. 6B shows an example of a montage composite image 492 using a 2×2 rectangular template.

In other embodiments, the composite image is formed by extracting the moving object from each of the digital images in the set of captured digital images 445 and combining them onto a common background image. Methods for identifying the boundaries of the moving object and extracting the moving object from the digital image are well-known in the art. Such methods typically work by aligning the backgrounds in the digital images, then computing differences between the aligned sequential digital images to identify the regions where there was movement. In some embodiments, the background from one of the digital images in the set of captured digital images 445 can be used as the common background image. In other embodiments, the backgrounds from a plurality of the digital images can be combined (e.g., by averaging them to remove noise) to form the common background image. FIG. 6C shows an example of a composite image 494 of this type where a moving object 496 is extracted from a plurality of digital images and combined with a common background image 498.

Returning now to a discussion of FIG. 4, the capture digital image sequence step 430 captures the digital image sequence 435 according to a set of image capture settings 455. The image capture settings 455 would include various settings such as an exposure time setting, a lens aperture setting, an exposure index setting, an image resolution setting, or a sensor readout configuration setting. In some embodiments one or more of the image capture settings is automatically determined using a determine image capture settings step 450 responsive to the determined rate of motion 415 for the moving object. The determine image capture settings step 450 can use any method known in the art to adjust the image capture settings 455 responsive to the rate of motion 415. One such method is taught in commonly-assigned, co-pending U.S. patent application Ser. No. 13/021,034 to Jasinski et al., entitled "Estimating subject motion for capture setting determination," which is incorporated herein by reference. According to this method, image capture settings, including an exposure time setting and an exposure index setting, are automatically determined for an electronic image capture device responsive to a motion velocity. In this way, an exposure time setting can be selected that is sufficient to stop the action of the moving object, while trading off against other considerations such as the increased level of spatial noise in the image that will result from the corresponding increase in the exposure index setting.

In some configurations, the image resolution setting to be used to capture the digital image sequence 435 will be a function of the frame rate 425, which in turn will be a function of the rate of motion 415. For high frame rates, it may be necessary to use a lower image resolution in order to have sufficient time to store the captured digital image into the buffer memory 18.

Similarly, it may be desirable to use different sensor readout configuration settings as a function of the rate of motion 415. If the moving object moves a significant distance during the time it takes to read out the lines of image data from the sensor, this can introduce a noticeable geometric distortion where the object position for the bottom of the image is spatially translated relative to the object position at the top of the image. To reduce this problem, a sensor readout configuration setting can be selected which enables the captured digital image to be read out from the image sensor 14 (FIG. 2) in a shorter time interval. For example, multiple lines of sensor data can be binned together so that a smaller number of image lines need to be read out. Full resolution image data can then be reconstructed by interpolation.

Figure 7A:
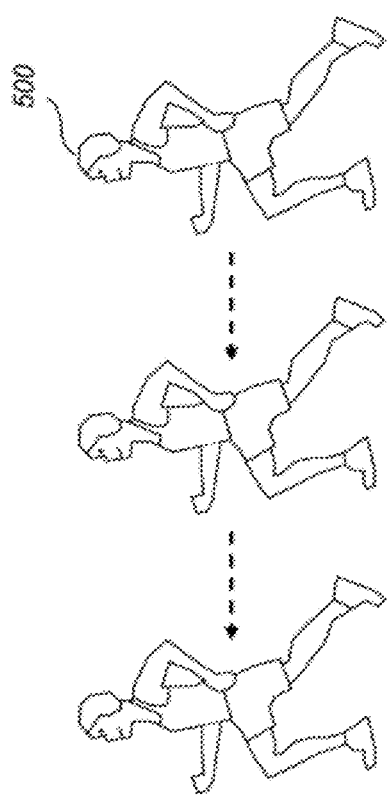
FIG. 7A illustrates a moving object transitioning through an image field of view with a constant velocity.

The above description assumes that the moving object has a uniform velocity. This situation is illustrated in FIG. 7A, which shows a moving object 500 transitioning through an image field of view with a constant rate of motion. The position of the moving object 500 is shown at three equally spaced times. In this example, the frame rate 425 (FIG. 4) that is determined based on the initial rate of motion will produce a set of captured digital images 445 (FIG. 4) having the desired distribution of object positions.

Figure 7B:
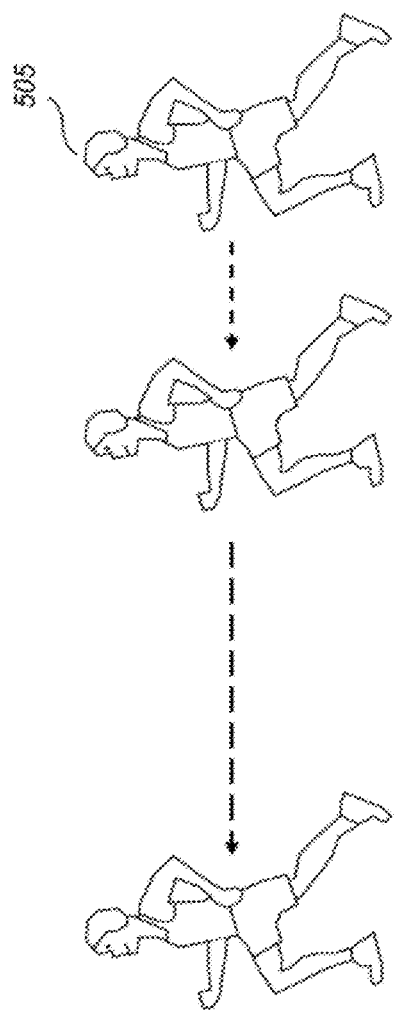
FIG. 7B illustrates a moving object transitioning through an image field of view with a non-constant velocity.

In some situations, the rate of motion for the moving object may vary during the time that the digital image sequence 435 (FIG. 4) is being captured. This is illustrated in FIG. 7B, which shows a moving object 505 transitioning through an image field of view with a non-constant velocity where the rate of motion is accelerating with time. In some embodiments, it may be desirable to adjust the determined frame rate 425 during the time that the digital image sequence 435 (FIG. 4) is being captured in order to compensate for the changing rate of motion. In one embodiment, this is done by determining a new rate of motion 415 after capturing each digital image in the digital image sequence. A new frame rate 425 can then be determined based on the new rate of motion 415. In this case, the number of images 485 can be decremented to correspond to the number of remaining digital images that still need to be captured. In this way, the spatial separation of the moving object can be maintained at an approximately equal value when the final composite image is generated.

Figure 8:
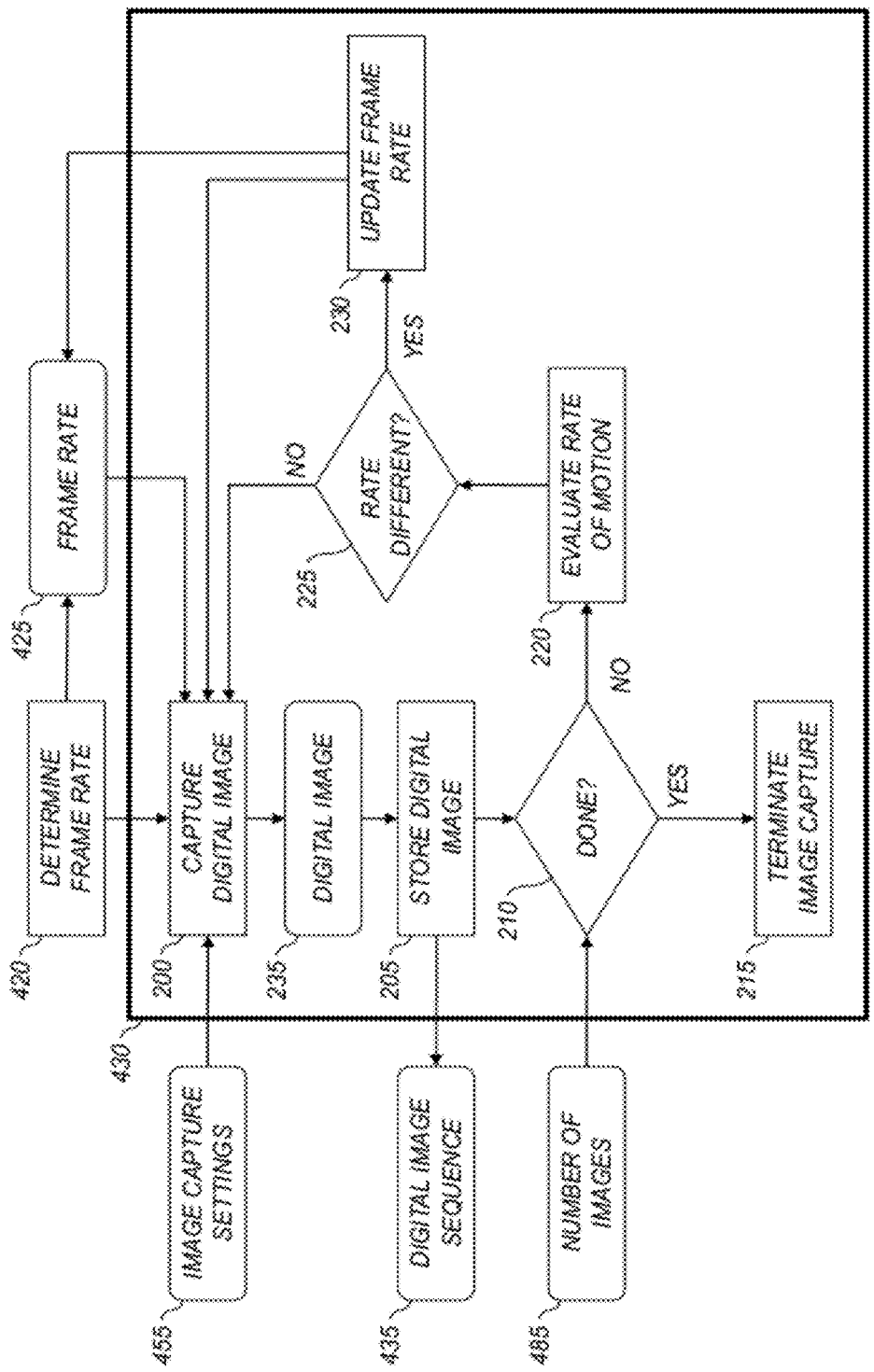
FIG. 8 flow chart showing additional details for the capture digital image sequence step of FIG. 4 according to one embodiment.

FIG. 8 shows a flow chart for an embodiment of the capture digital image sequence step 430 where the frame rate 425 is updated to account for a moving object with a variable rate of motion. A capture digital image step 200 captures a digital image 235 of the scene. A store digital image step 205, then stores the digital image 235 in the buffer memory 18 (FIG. 2) as part of the digital image sequence 435. A done test 210 is used to determine whether the full burst of digital images has been captured. If the number of digital images that have been captured is equal to the number of images 485 then the capture digital image sequence step 430 terminates at terminate image capture step 215. Otherwise, execution proceeds to an evaluate rate of motion step 220. In some cases, the done test 210 may also check to verify that the buffer memory 18 (FIG. 2) is not full. If the buffer memory 18 is full then execution of the capture digital image sequence step 430 is terminated.

The evaluate rate of motion step 220 determines a new rate of motion for the moving object in the scene. In a preferred embodiment, this is done by determining the spatial position of the moving object in the two most recent digital images that were captured, and computing a rate of motion based on the difference between the spatial positions. A rate different test 225 is used to compare the new rate of motion to the previously determined rate of motion. If the difference between the two rates of motion is less than some predefined threshold, then execution loops back to the capture digital image step 200, where another digital image 235 is captured. If the rate different test 225 determines that the rate of motion has changed significantly, an update frame rate step 230 is used to determine a new frame rate 425 appropriate for the new rate of motion. If the new rate of motion is significantly slower than the previous rate of motion, then the spatial separation between the two previous images may be too small. In this case, it may be desirable to delete the previously captured digital image from the digital image sequence 435. Execution then loops back to the capture digital image step 200, where another digital image 235 is captured.

In another embodiment, the capture digital image sequence step 430 of FIG. 4 captures the digital image sequence 435 at a predetermined fixed frame rate as was described earlier with respect to one of the alternate embodiments. However, rather than selecting a subset of the captured digital image based on determining a frame rare responsive to a determined velocity of a moving object, the subset of the captured digital images can be selected based on the positions of the moving object in each captured digital image.

Figure 9:
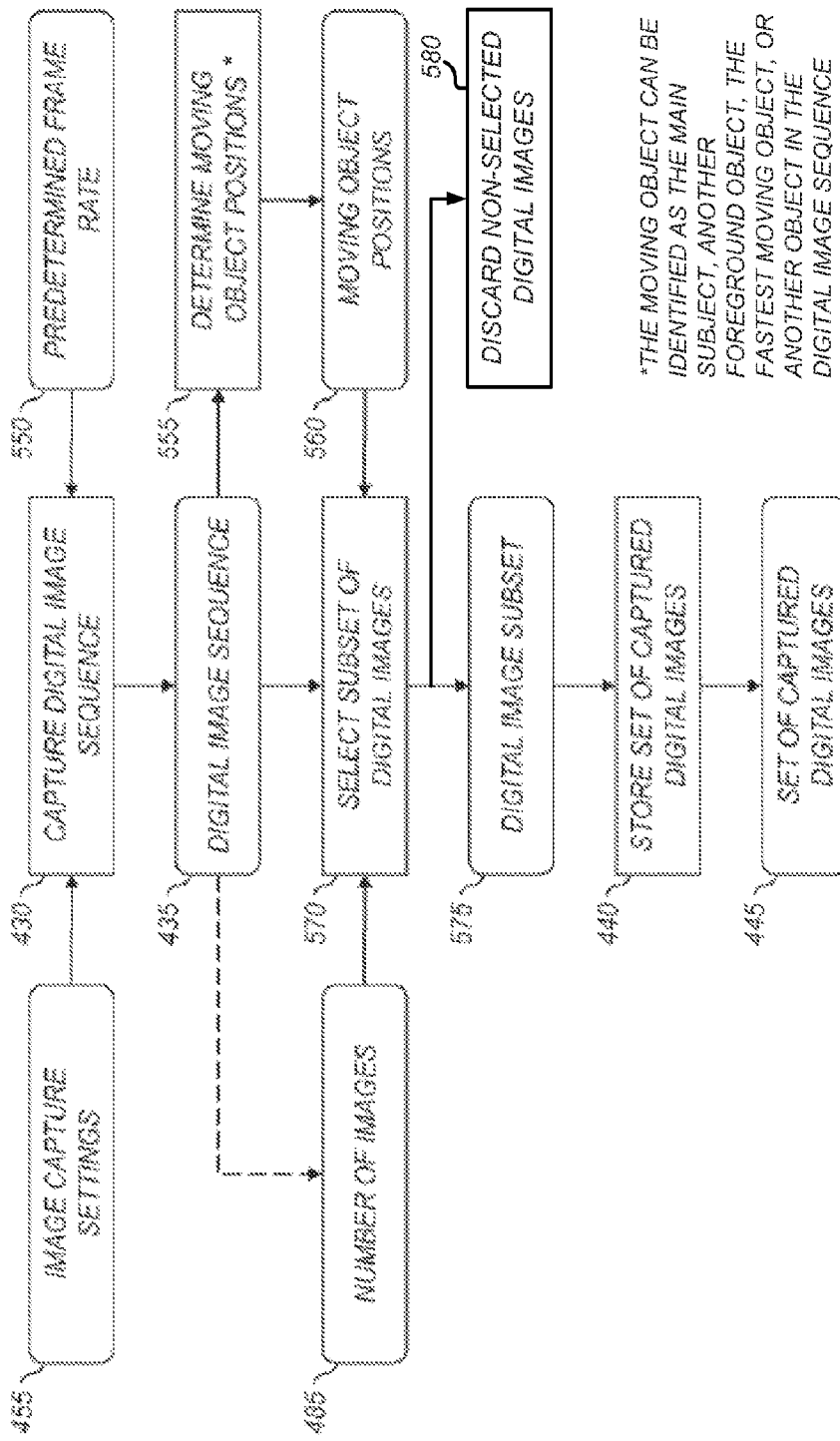
FIG. 9 is a flow chart of a method for capturing a sequence of digital images in a burst image capture mode according to an alternate embodiment.

FIG. 9 is a flow chart of a method for selecting a set of captured digital images based on the position of a moving object. In this embodiment, the capture digital image sequence step 430 captures the digital image sequence 435 based on a predetermined frame rate 550, together with appropriate image capture settings 455.

The predetermined frame rate 550 can be a fixed frame rate (e.g., 4 frames/sec) associated with a burst image capture mode for a digital still camera. The fixed frame rate can be user selectable in some configurations, using appropriate user interface controls. Alternately, the predetermined frame rate 550 can be a video frame rate associated with capturing a video sequence in a video capture mode.

In some embodiments, the capture digital image sequence step 430 is initiated when a user activates a shutter button, and wherein digital images are captured at the predetermined frame rate until the user releases the shutter button. (Note that the term shutter button as used herein is intended to cover not only a conventional mechanical shutter button, but also any other type of image capture control on the user interface of the digital camera 10, such as a touch screen control or the like.) In this way, the number of digital images in the digital image sequence will be variable so that the length of time spanned by the digital image sequence 435 is under the user control. This enables the user to start and stop the capturing of the digital images when the moving object has covered the desired range of motion. In alternate embodiments, the digital image sequence 435 has a fixed number of digital images. In this case, the capture of the first image can coincide with the activation of the shutter button, and the capture digital image sequence step 430 will continue to capture successive images until the fixed number of digital images has been reached.

A determine moving object positions step 555 is used to identify a moving object in the digital image sequence 435 and determine a set of moving object positions 560 for the moving object corresponding to the position of the moving object in each of the digital images in the digital image sequence 435. As with the embodiments discussed previously, the moving object can be identified according to various criteria. For example, the moving object can be the main subject in the scene as determined using a main subject detection algorithm, the moving object can be some other foreground object in the scene, or the moving object can be an object determined to be the fastest moving object in the scene.

A select subset of digital images step 570 is used to select a digital image subset 575 responsive to the moving object positions 560 and the number of images 485. The digital image subset 575 corresponds to a set of captured digital images where the position of the moving object most nearly corresponds to a set of desirable positions. The store set of captured digital images step 440 is then used to store the digital image subset 575 as the set of captured digital images 445 as described earlier. In some embodiments, the captured digital images in the digital image sequence 435 that are not included in the digital image subset 575 can be discarded as illustrated by optional step 580. In other embodiments, they can be retained for use in other applications. For example, if the digital image sequence 435 is a digital video sequence, then it may be desirable to retain the original digital video sequence for viewing as a video, while also creating a composite image using the digital image subset 575.

As was described earlier, the number of images 485 can be predefined based on a fixed setting or user selectable setting, or alternately can be determined responsive to a determined size of the moving object. In this last case, the number of images 485 is determined such that the image of the moving object in each of the digital images in the digital image subset 575 will be substantially non-overlapping with the images of the moving object in the other digital images in the digital image subset 575. If the size of the moving object is larger, then a smaller number of images 485 must be used in order for the images moving object to be substantially non-overlapping.

Generally, the set of desirable positions for the moving object will correspond to positions where the moving object is spaced out across the image with approximately uniform spacings. In one embodiment, this can be done by first determining a range of positions for the moving object in the sequence of captured digital images. If there are digital images where the moving object is fully (or partially) out of the field of view of the frame, these digital images can be neglected. A desired spacing can then be determined between the positions of the moving objects responsive to the range of positions and the number of images 485. Preferably, the desired spacing will simply be the range of positions divided by the number of intervals. (The number of intervals will be the number of images 485 minus one.). The set of desirable positions can then be determined responsive to the range of positions and the desired spacing. Finally, the digital image subset 575 can be identified by identifying the digital images in the digital image sequence 435 where the positions of the moving object most nearly correspond to the set of desirable positions.

Figure 10B:
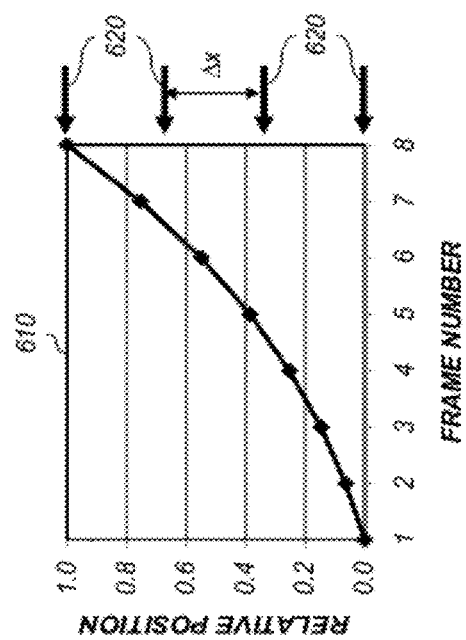
FIG. 10B shows a relative position graph corresponding to the moving object in the digital image sequence of FIG. 10A.
Figure 10C:
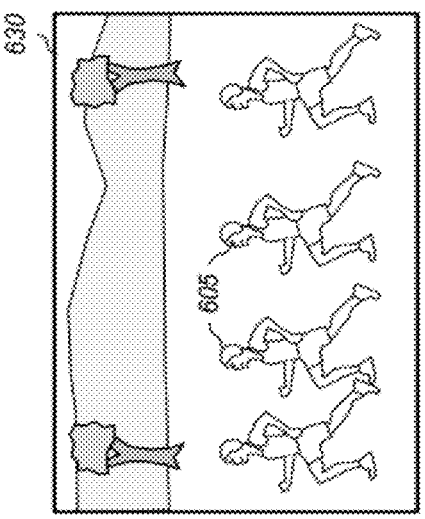
FIG. 10C shows a composite image formed using a digital image subset determined from the digital image sequence of FIG. 10A.
Figure 10A:
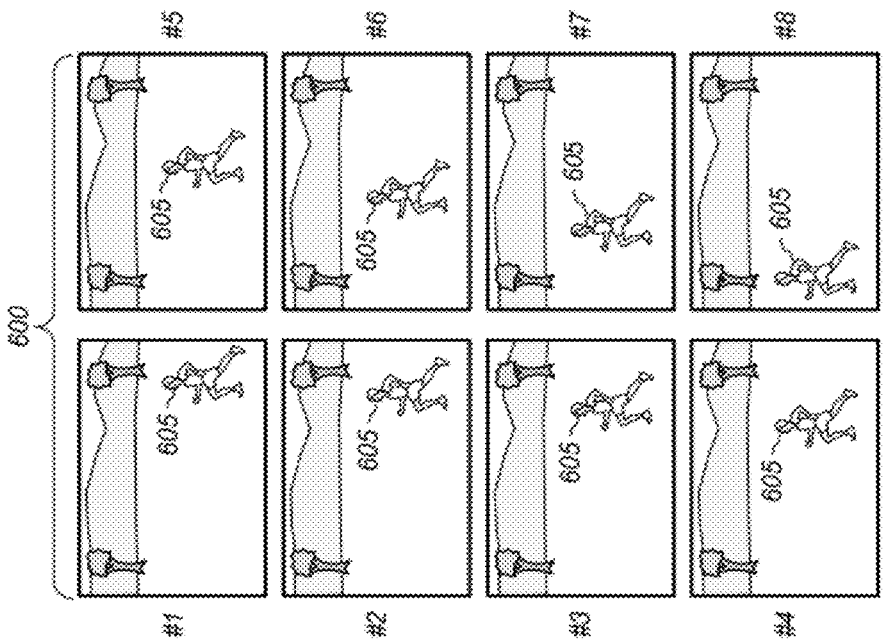
FIG. 10A shows an example sequence of digital images containing a moving object.

To illustrate the above-described method for selecting the digital image subset 575, consider FIG. 10A which shows a sequence of digital images 600 captured with a predetermined frame rate 550 (FIG. 9). The sequence of digital images 600 includes eight digital image frames (numbered as #1-#8), each of which contains a moving object 605. An object tracking algorithm is used to analyze the sequence of digital images 600 to automatically determine the object positions in each digital image. A corresponding relative position graph 610 plotting relative object position as a function of the digital image frame number is shown in FIG. 10B. The relative object position, $x_r$, in this case is determined using the equation:

$$x_r = (x_i - x_s)/(x_f - x_s) \qquad (7)$$

where $x_i$ is the object position in the ith digital image frame, and $x_s$ and $x_f$ are the starting and final object positions, respectively.

A set of desired object positions 620 can be determined by dividing the range of relative object positions into equal intervals $\Delta x$. In this example, the number of images 485 is N=4, so that the corresponding spacing is given by $\Delta x=1/(N-1)=1/3$. From FIG. 10B, it can be seen that the digital image frames where the position of the moving object most closely matches the desired object positions 620 are digital image frames #1, #5, #7 and #8. These four digital image frames can be selected for inclusion in the digital image subset 575 (FIG. 9), and can be used to form a composite image 630 as shown in FIG. 10C. It can be seen that the spacing between the positions of the moving object 605 in the composite image 630 is approximately uniform, although there can be some small variation due to the discrete sampling of available object positions. The higher the predetermined frame rate 550 (FIG. 9), the smaller the spacing variation will be, although this comes at the expense of needing to buffer a larger number of image frames in the digital image sequence 435 (FIG. 9).

Figure 11A:
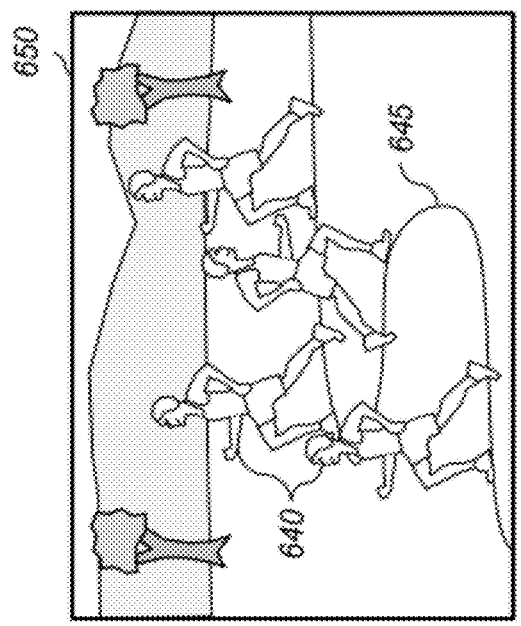
FIG. 11A shows an example an object moving on a complex two-dimensional path of motion.

It should be noted that while the example illustrated in FIGS. 10A-10C shows only motion in the horizontal direction, and the calculation of a corresponding horizontal interval $\Delta x$, the method can easily be extended to cases where the motion occurs vertically, or along a two-dimensional path. For example, FIG. 11A shows an example where a moving object 640 traces out a complex two-dimensional path of motion 645 through the image plane. The nature of the motion causes the subject to occupy the same spatial position at very different moments in time. Also, the path followed by the subject creates accelerations and decelerations requiring sampling of the image to be non-uniform in time in order to get a visually pleasing composite. In one embodiment, a relative position graph is determined corresponding to a distance along the two-dimensional path of motion 645 as a function of time. This can then be used to select the subset of the digital images as was described with respect to FIG. 10B.

Figure 11B:
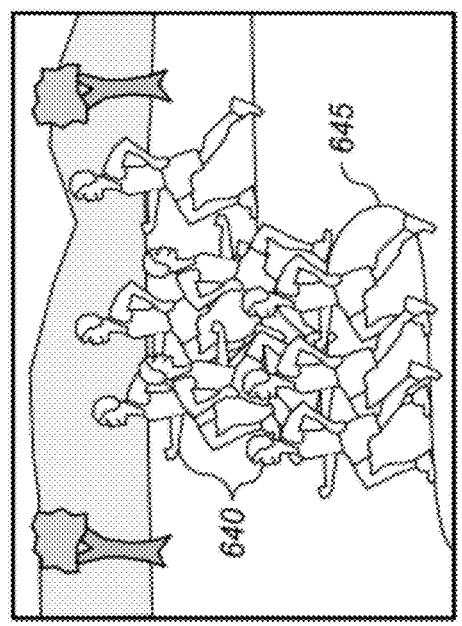
FIG. 11B shows a composite image formed using a digital image subset determined for the moving object of FIG. 11A.

In some embodiments, a constraint can also be placed onto process of selecting the subset of digital images such that digital images are selected where the images of the moving object will be substantially non-overlapping. A composite image 650 formed in this manner is shown in FIG. 11B.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

Parts List 2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
26 speaker
28 firmware memory
30 image memory
32 image display
34 user controls
36 display memory
38 wired interface
40 computer
44 video interface
46 video display
48 interface/recharger
50 wireless modem
52 radio frequency band
54 motion analysis block
58 wireless network
70 Internet
72 photo service provider
90 white balance setting
95 white balance step
100 color sensor data
105 noise reduction step
110 exposure index setting
115 demosaicing step
120 resolution mode setting
125 color correction step
130 color mode setting
135 tone scale correction step
140 contrast setting
145 image sharpening step
150 sharpening setting
155 image compression step
160 compression mode setting
165 file formatting step
170 metadata
175 photography mode settings
180 digital image file
185 camera settings
190 composite settings
195 burst image compositing step
200 capture digital image step
205 store digital image step
210 done test
215 terminate image capture step
220 evaluate rate of motion step
225 rate different test
230 update frame rate step
235 digital image
400 capture evaluation images step
405 evaluation digital images
410 determine rate of motion step
415 rate of motion
420 determine frame rate step
425 frame rate
430 capture digital image sequence step
435 digital image sequence
440 store set of captured digital images step
445 set of captured digital images
450 determine image capture settings step
455 image capture settings
460 determine initial object position step
465 initial object position 470 determine projected time interval step
475 projected time interval
480 compute frame rate step
485 number of images
490 montage composite image
492 montage composite image
494 composite image
496 moving object
498 background image
500 moving object
505 moving object
550 predetermined frame rate
555 determine moving object positions step
560 moving object positions
570 select subset of digital images step
575 digital image subset
600 sequence of digital images
605 moving object
610 relative position graph
620 desired object positions
630 composite image
640 moving object
645 two-dimensional path of motion
650 composite image

The invention claimed is:

1. A digital camera having a burst image capture mode, comprising:
   an image sensor for capturing a digital image;
   an optical system for forming an image of a scene onto the image sensor;
   a data processing system;
   an image memory for storing captured digital images; and
   a program memory communicatively connected to the data processing system and storing instructions configured to cause the data processing system to:
      capture a sequence of digital images of the scene using the image sensor, each digital image in the sequence of captured digital images being captured at a different time;
      identify a moving object in the sequence of captured digital images;
      determine, automatically, a position of the moving object in each of the sequence of captured digital images;
      select, automatically, a subset of digital images from the sequence of captured digital images wherein the moving object has positions that most nearly correspond to a set of desirable positions by causing the data processing system to:
         determine a range of positions for the moving object in the sequence of captured digital images;
         determine a desired spacing between the positions of the moving object responsive to the determined range of positions and a specified number of digital images to be included in the subset of digital images;
         determine a set of desirable positions for the moving object responsive to the desired spacing; and
         identify the subset of digital images wherein the positions of the moving object most nearly correspond to the set of desirable positions; and
      store the selected subset of digital images in the image memory.

2. The digital camera of claim 1 wherein the specified number of digital images is determined such that the position of the moving object in each of the digital images in the subset of digital images will be substantially non overlapping with the positions of the moving object in the other digital images in the subset of digital images.

3. The digital camera of claim 1 wherein the sequence of digital images is captured at a predetermined frame rate.

4. The digital camera of claim 3 wherein the instructions configured to cause the data processing system to capture the sequence of digital images are initiated by activation of a shutter button, and wherein digital images are captured at the predetermined frame rate until deactivation of the shutter button.

5. The digital camera of claim 1 wherein the captured sequence of digital images includes a predefined number of digital images.

6. The digital camera of claim 1 wherein the moving object is an object determined to be a fastest moving object in the scene.

7. The digital camera of claim 1 wherein the digital images in the stored subset of digital images are combined to form a composite image, and wherein the composite image is stored in the image memory.

8. The digital camera of claim 7 wherein the composite image comprises a montage image that includes each of the digital images in the stored subset of digital images.

9. The digital camera of claim 7 wherein the composite image is formed by instructions configured to cause the data processing system to extract the moving object from each of the digital images in the stored subset of digital images and combine each said extracted moving object onto a common background image.

10. The digital camera of claim 9 wherein the common background image corresponds to a background from one of the digital images in the stored subset of digital images, or to a combination of the backgrounds from a plurality of the digital images in the stored subset of digital images.

11. The digital camera of claim 1 wherein the captured digital images not in the identified subset of digital images are discarded.

12. The digital camera of claim 1 wherein the captured sequence of digital images comprises a digital video sequence.

13. An image capture method, comprising:
   capturing a sequence of digital images of a scene using an image sensor, each digital image in the sequence of captured digital images being captured at a different time;
   identifying a moving object in the sequence of captured digital images;
   automatically determining a position of the moving object in each of the sequence of captured digital images;
   automatically selecting a subset of digital images from the sequence of captured digital images wherein the moving object has positions that most nearly correspond to a set of desirable positions by
      determining a range of positions for the moving object in the sequence of captured digital images,
      determining a desired spacing between the positions of the moving object responsive to the determined range of positions and a specified number of digital images to be included in the subset of digital images,
      determining a set of desirable positions for the moving object responsive to the desired spacing, and
      identifying the subset of digital images wherein the positions of the moving object most nearly correspond to the set of desirable positions; and
   storing the selected subset of digital images in an image memory.

14. The method of claim 13, wherein the specified number of digital images is determined such that the position of the moving object in each of the digital images in the subset of digital images will be substantially non-overlapping with the positions of the moving object in the other digital images in the subset of digital images.

15. The method of claim 13, wherein the sequence of digital images is captured at a predetermined frame rate.

16. The method of claim 13, wherein the digital images in the subset of digital images are combined to form a composite image, and wherein the composite image is stored in the image memory.

17. The method of claim 16, wherein the composite image comprises a montage image that includes each of the digital images in the subset of digital images.

18. The method of claim 16 wherein the composite image is formed by extracting the moving object from each of the digital images in the subset of digital images and combining each said extracted moving object onto a common background image.

19. The method of claim 13, wherein the captured sequence of digital images comprise a digital video sequence.

20. A non-transitory program storage device comprising instructions stored thereon to cause one or more processors to:

capture a sequence of digital images of the scene using the image sensor, each digital image in the sequence of captured digital images being captured at a different time;

identify a moving object in the sequence of captured digital images;

determine, automatically, a position of the moving object in each of the sequence of captured digital images;

select, automatically, a subset of digital images from the sequence of captured digital images wherein the moving object has positions that most nearly correspond to a set of desirable positions by causing the data processing system to - determine a range of positions for the moving object in the sequence of captured digital images;

determine a desired spacing between the positions of the moving object responsive to the determined range of positions and a specified number of digital images to be included in the subset of digital images;

determine a set of desirable positions for the moving object responsive to the desired spacing; and identify the subset of digital images wherein the positions of the moving object most nearly correspond to the set of desirable positions; and store the selected subset of digital images in the image memory.

* * * * *